April 7, 1936.　　　A. S. CARLSON　　　2,036,792
METAL CLAD ELECTRICAL APPARATUS
Filed Dec. 22, 1932
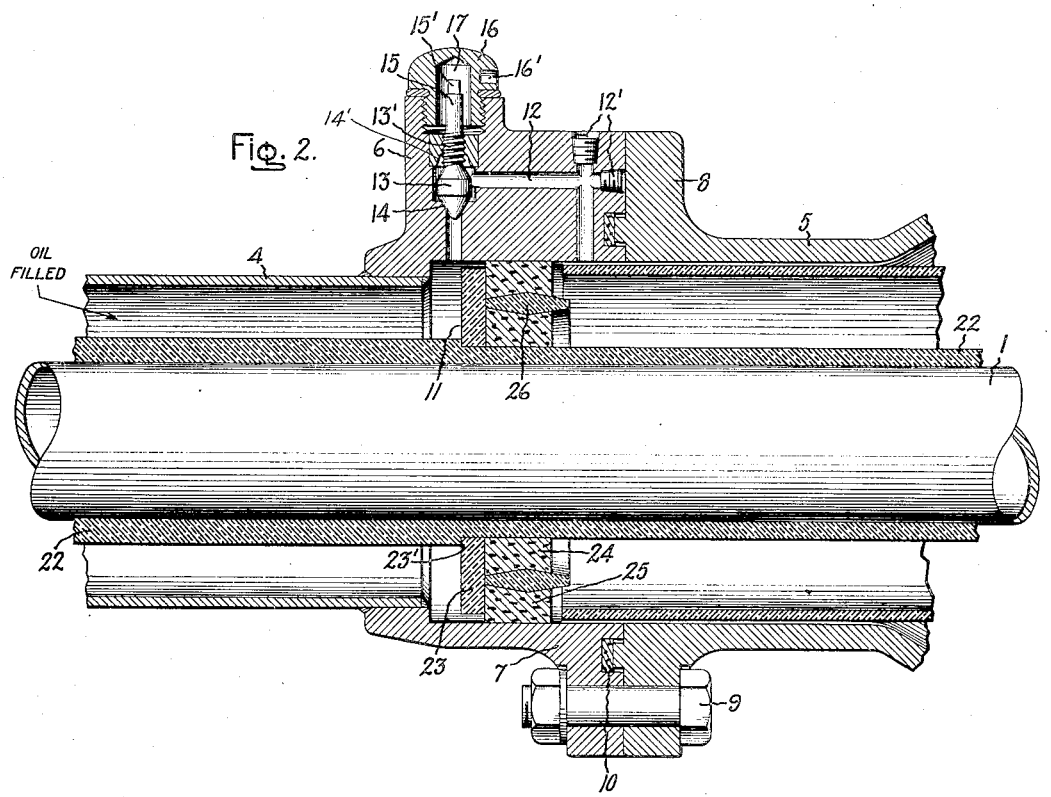
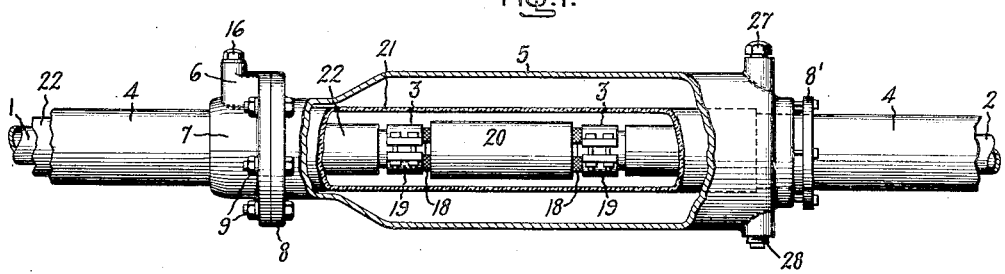
Inventor:
Arvid S. Carlson,
by Charles E. Mueller
His Attorney.

Patented Apr. 7, 1936

2,036,792

UNITED STATES PATENT OFFICE 2,036,792

METAL CLAD ELECTRICAL APPARATUS

Arvid S. Carlson, La Grange, Ill., assignor to General Electric Company, a corporation of New York Application December 22, 1932, Serial No. 648,451

4 Claims. (Cl. 247—27)

My invention relates to metal clad electrical apparatus, more particularly to the liquid-insulated or oil-filled type of metal clad switchgear comprising factory built units arranged to be interconnected in the field to form a complete station.

The field assembly of factory built metal clad switchgear units for example, particularly when the complete units are each shipped from the factory filled with oil, has heretofore involved difficulties including the interconnecting of the corresponding conductors or busbar sections of adjacent units. In general, a conductor or busbar connection between units was enclosed by a housing or junction box which was separately filled with oil by means of oil connections from an oil reservoir. In view of the size of stations of this type, the oil lines in many cases were of considerable length, thereby complicating and slowing up the assembly process.

A principal object of my invention is the provision in metal clad switchgear of the aforesaid type of improved oil filling means for the coupling or junction housings enclosing the connections between the conductors or busbars of adjacent units or sections.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a fragmentary view, partly in section, of interconnected metal clad busbar sections embodying my invention, and Fig. 2 is an enlarged detailed view, partly in section, of structure shown in Fig. 1.

In Fig. 1 there is shown a portion of metal clad busbar structure of the oil-filled type. The busbar as illustrated is formed by the sections 1 and 2 which are interconnected as at 3 to form a continuous conductor. Each busbar section comprises a tubular conductor composed of copper or other suitable conducting material and is provided with an enclosing metallic casing 4. The connected ends of the busbar sections 1 and 2 extend beyond the ends of the casings 4, the connected ends of said sections being enclosed by a coupling housing 5 disposed between the busbar casings 4.

For the purpose of insulating the busbar sections with respect to the casings 4, which in the present case are formed as pipes in which the corresponding busbar section is concentrically disposed, each busbar casing is filled with a suitable insulating liquid, as oil, and the end of each casing is sealed as hereinafter described so as to prevent loss of oil.

The busbar sections 4, above described, may comprise parts of individual factory built switchgear units, the corresponding units including the busbar sections 1 and 2 respectively being enclosed in metal and oil filled prior to shipment. In the interest of clearness, the complete switchgear units and the insulating oil therefor are not shown, such disclosure being unnecessary for an understanding of the present invention. When the individual oil filled units are assembled in the field the conductors and busbars are interconnected without necessitating draining of the oil by means of the coupling housings as above described.

In accordance with my invention the coupling housing 5 is filled with oil to complete the insulating of the conductor or busbar connection by admitting oil from an adjacent busbar casing. To this end a valve controlled passage interconnecting the interiors of a casing 4 and the coupling housing 5 is arranged so as to by-pass the oil seal at the end of said casing and to introduce oil from the casing to said coupling housing. This transfer of oil is facilitated by the fact that in practice the oil in the busbar casings 4 is maintained at a substantially constant pressure as by permanently connected overhead oil reservoirs (not shown).

Referring more particularly to Fig. 2, the oil transfer means above referred to comprises a valve housing 6 mounted on the busbar casing 4 at that end which is connected to the coupling housing 5. The valve housing 6 may conveniently form a part of the securing collar flange 7 which is fitted and braced to the end of the casing 4, the coupling housing 5 being provided with a coacting flange 8. The casing 4 and coupling housing 5 are united in any suitable manner, as by the securing bolts 9, a liquid seal being effected by a resilient gasket 10. The opposite end of the housing 5 makes a sliding liquid-tight connection with the coacting busbar casing 4 by means of the gland structure indicated at 8' in Fig. 1. For the purpose of preventing loss of oil from the casing 4 during shipment, an oil stopper or seal 11 is provided at the end of the casing, the oil stopper in the present instance being mounted as hereinafter described within the securing flange 7.

The valve housing 6 is provided with a fluid passage 12 by-passing the oil stopper 11 and interconnecting the interiors of casing 4 and coupling 5. The passage 12 is conveniently formed in the present case by intersecting drill holes, the unnecessary openings being suitably closed by conventional pipe plugs 12'. The passage 12 is controlled by a valve 13 arranged to seat within the passage at 14 and provided with an operating shaft 15. The valve 13 is rotatably mounted within the valve housing and has a screw engagement as at 13' therewith so that rotation of shaft 15 causes vertical movement of the valve. The valve of course seats at 14 and closes the by-pass 12 during shipment of the metal clad oil-filled units and is opened when the housing 5 is permanently assembled and ready for oil filling. During oil transfer and after installation of the oil-filled units the valve 13 engages the upper valve seat 14' so as to block leakage through the screw thread 13'. For the purpose of convenience in operating the valve, the cap 16, which normally closes access to the valve and which receives the shaft 15 within a recess 17, is provided with an opening 16' corresponding to the polygonal extension 15'. Accordingly, after the cap 16 is removed, it may be used to operate the valve 15.

In practice the coupling housing 5 is slipped over the connection from the casing of busbar section 2 and firmly bolted in position after the corresponding ends of the busbar sections have been connected as illustrated. In the present case, referring to Fig. 1, the busbars are interconnected by flexible braided conductors 18 which are secured by clamps 19 to the adjacent ends of the busbar sections. A flexible union between busbar sections is thereby provided. An insulating sleeve 20 preferably encloses the flexible conductors 18. The busbar connection is likewise enclosed by an insulating tube 21 which extends throughout the length of the housing 5. For the purpose of properly insulating the busbar for high voltages, each section is provided with an insulating coating 22 which, together with the oil filling the annular space between the busbar and enclosing housing, prevents voltage breakdown between the busbar and its grounded metallic casing.

The oil stopper 11 per se forms no part of my invention and is disclosed and specifically claimed in a copending application Serial No. 648,452 and which has now matured into Patent No. 1,992,031, for Insulating liquid seal filed concurrently herewith by H. J. Huber. The stop comprises an insulating collar 23 mounted on the busbar section and seating in a shoulder 23' formed by the busbar insulation 22. The collar 23 serves as a backing or bracing member for the pair of concentric cork rings 24 and 25. The cork rings are driven against the backing collar 23 and radially against the busbar insulation and the securing flange 7 by an insulation wedging ring 26. The ring 26 is so formed that the cork rings are wedged into firm sealing engagement as above described.

During filling of the coupling housing 5 with oil escape of air may be effected by means of a valve indicated at 27. Drainage of the coupling housing may likewise be effected by removal of the pipe plug 28.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. In metal clad electrical apparatus including a conductor section, an enclosing casing for said section, an insulating liquid filling said casing for insulating said conductor, means sealing said casing to prevent loss of insulating liquid, a coupling housing connected to said casing, said casing and coupling housing having coacting flanges forming a liquid passage between said casing and coupling housing, a stopper between said casing and housing forming a liquid seal by-passed by said passage, and means for controlling flow of insulating liquid through said liquid passage comprising a valve, said valve having actuating means positioned exteriorly of said apparatus so as to be directly accessible.

2. In metal clad electrical apparatus including individual conductor sections arranged to form a continuous conductor, an enclosing metallic casing for each section, an insulating liquid sealed within said casing, and a conductor coupling housing disposed between adjacent liquid filled casings and rigidly connected to one of said casings, a valve housing mounted on and exteriorly of said one of said casings and forming part of the rigid connection between the same and said coupling housing, a stopper between said one casing and said housing forming a liquid seal, said valve housing having a fluid passage for interconnecting the interiors of said casing and coupling housing and by-passing said stopper, and a valve operable exteriorly of said coupling housing for controlling the passage so that said coupling housing may be filled with insulating liquid from said casing.

3. In metal clad electrical apparatus including an electrical conductor in two sections, each of said sections having a sealed oil-filled enclosing casing beyond which said conductors extend for electrical connection with each other, enclosing and insulating means comprising a sleeve-like coupling housing enclosing the connection between said conductor sections, means detachably securing one of said casings to said coupling housing at one end thereof, a stopper positioned in said securing means forming a liquid seal for said casing, means forming a sliding seal between the other end of said housing and the other of said casings, a valve housing located at and incorporated in the aforesaid detachable securing means and having a passage formed by said securing means arranged to interconnect the interiors of the adjacent conductor casing and said coupling housing when they are secured together so as to by-pass said stopper, and a valve having actuating means positioned exteriorly of said housing for controlling said passage.

4. In metal clad electrical apparatus including an electrical conductor in two sections, each of said sections having a sealed oil filled enclosing casing beyond which said conductors extend for electrical connection with each other, a coupling housing enclosing the connection between said conductor sections, one of said casings and said coupling housing having respectively coacting securing flanges, said casing flange including a valve housing having a passage arranged to interconnect the interiors of said casing and said coupling housing, a stopper between said casing and housing forming a liquid seal by-passed by said passage, and a valve mounted in said valve housing for controlling said passage.

ARVID S. CARLSON.